US009185855B2

(12) United States Patent
Humphrey

(10) Patent No.: US 9,185,855 B2
(45) Date of Patent: Nov. 17, 2015

(54) TREE REMOVAL—FIELD RECLAMATION ATTACHMENT

(71) Applicant: John L. Humphrey, St. Charles, MO (US)

(72) Inventor: John L. Humphrey, St. Charles, MO (US)

(*) Notice: Subject to any disclaimer, the term of this patent is extended or adjusted under 35 U.S.C. 154(b) by 79 days.

(21) Appl. No.: 14/056,544

(22) Filed: Oct. 17, 2013

(65) Prior Publication Data

US 2015/0107137 A1 Apr. 23, 2015

(51) Int. Cl.
*E02F 3/96* (2006.01)
*A01G 23/06* (2006.01)
*E02F 3/78* (2006.01)

(52) U.S. Cl.
CPC .............. *A01G 23/06* (2013.01); *A01G 23/062* (2013.01); *E02F 3/78* (2013.01); *E02F 3/962* (2013.01)

(58) Field of Classification Search
CPC ........... E02F 3/961; E02F 3/404; E02F 3/962; E02F 3/78; A01G 23/062; A01G 23/06; A01G 23/065; B25J 15/0009; B25J 15/10; B25J 15/103; B66C 3/02; B66C 1/422; D02F 9/2808; D02F 9/2816; A01D 87/003
USPC ......... 37/406, 301, 302; 254/132, 103.1, 104; 414/450, 453, 621, 740; 901/39
See application file for complete search history.

(56) References Cited

U.S. PATENT DOCUMENTS

| 2,776,768 | A | * | 1/1957 | Carlson | 414/732 |
|---|---|---|---|---|---|
| 2,886,194 | A | * | 5/1959 | Codlin | 414/740 |
| 3,250,028 | A | * | 5/1966 | Hunger et al. | 37/406 |
| 3,305,118 | A | * | 2/1967 | Le Grand | 414/704 |
| 3,307,277 | A | * | 3/1967 | Kondracki | 37/450 |
| 3,344,540 | A | * | 10/1967 | Ulrich | 37/406 |
| 3,376,907 | A | | 4/1968 | McNeal | |
| 3,427,640 | A | | 2/1969 | Clatterbuck | |
| 3,508,676 | A | * | 4/1970 | Peterson | 414/704 |
| 3,567,050 | A | * | 3/1971 | Pasquazzi et al. | 414/740 |
| 3,974,925 | A | * | 8/1976 | McKenzie | 414/23 |
| 4,283,866 | A | * | 8/1981 | Ogawa | 37/406 |
| 4,372,063 | A | * | 2/1983 | Work | 37/301 |
| 4,445,557 | A | | 5/1984 | Peters, III | |
| 4,493,605 | A | * | 1/1985 | Cullen | 414/726 |
| 5,062,227 | A | * | 11/1991 | De Gier et al. | 37/406 |
| 5,328,223 | A | | 7/1994 | Maggio | |
| 5,802,747 | A | * | 9/1998 | Nojima | 37/403 |
| 5,901,477 | A | | 5/1999 | Weaver | |
| 6,098,320 | A | | 8/2000 | Wass | |
| 6,287,072 | B1 | * | 9/2001 | Wasilas | 414/729 |
| 6,308,440 | B1 | | 10/2001 | Mueller | |
| 6,357,993 | B1 | | 3/2002 | Burton | |
| 6,526,678 | B2 | | 3/2003 | Waddington, Jr. | |

(Continued)

*Primary Examiner* — Robert Pezzuto
*Assistant Examiner* — Jessica H Lutz
(74) *Attorney, Agent, or Firm* — Grace J. Fishel

(57) ABSTRACT

An attachment with a back support frame adaptable for use with a variety of loaders for use in tree removal and field reclamation. The back support frame has a curved front wall serving as a moldboard and a bottom wall with a cutting edge for grading dirt. A stationary lower jaw generally trapezoidal in plan is attached to the back support frame and is made of a plurality of cross braced blades forming a see-through grid through which dirt may be sifted with spade-tipped teeth at a distal end for digging and replaceable strips of saw teeth on the outer blades for ripping tree roots. A movable upper jaw with obliquely mounted grapple arms is mounted on the back support frame and is independently movable towards and away from the stationary lower jaw for applying three-point pressure to a root ball or tree trunk.

17 Claims, 11 Drawing Sheets

(56) References Cited

U.S. PATENT DOCUMENTS

| | | |
|---|---|---|
| 6,820,357 B1 | 11/2004 | Menard et al. |
| 7,913,431 B1 * | 3/2011 | Beam et al. ..................... 37/406 |
| 8,001,708 B1 | 8/2011 | Reed |
| 8,069,591 B2 | 12/2011 | Dunn |
| 2007/0033839 A1 | 2/2007 | Jarvinen et al. |
| 2008/0282585 A1 * | 11/2008 | Cox ................ 37/406 |
| 2009/0077840 A1 * | 3/2009 | Zeno et al. ..................... 37/468 |
| 2010/0219387 A1 | 9/2010 | Molino |
| 2013/0216347 A1 * | 8/2013 | Breuer et al. ................. 414/739 |

* cited by examiner

TREE REMOVAL—FIELD RECLAMATION ATTACHMENT

BACKGROUND OF THE INVENTION

1. Field of the Invention

The present invention relates to an attachment for a loader for use in uprooting trees, stacking them, backfilling the root holes and grading the area.

2. Brief Description of the Prior Art

Small earth moving loaders such as skid loaders, track loaders, front loaders and so forth are in common use and many contractors currently own one or more. Such machines are also available for rental. As currently practiced, the clearing of trees and brush with a loader requires a variety of implements. For example, a pushing device may be used for knocking trees over, a grapple for picking them up and a blade to back fill the root ball holes and grade the area. Maintaining an inventory of attachments is expensive, as is transporting them to a job site. Numerous changeovers from one attachment to another is labor intensive, and therefore also costly. What is needed is a single attachment that can perform multiple ground clearing operations with a loader that the user already has or can readily obtain.

BRIEF SUMMARY OF THE INVENTION

In view of the above, it is an object of the present invention to provide an attachment adaptable for use on a variety of loaders and comprising a single piece of equipment which may be used to uproot trees, stack them, backfill the root holes and grade the area. Other objects and features of the invention will be in part apparent and in part pointed out hereinafter.

In an embodiment of the invention an attachment for a loader includes a back support frame having a curved front wall, a top wall and a bottom wall, side walls and a reinforced back wall adaptable for attachment to a loader; a stationary lower jaw comprised of a plurality of blades angularly attached to the back wall, cross braced and extending forward of the bottom wall, a removable section of sawteeth mounted to each outer blade; and a movable upper jaw comprising of a pair of grapple claws obliquely mounted in first and second pivot support structures on the top wall of the back support frame with a hydraulic cylinder positioned on the back side of each claw such that the claws are independently movable towards and away from the stationary jaw for applying three-point pressure.

In other embodiments of the invention the attachment has one or more of the following features:

(1) the back support frame is of welded construction and is internally reinforced with square tubing members along an upper edge and a lower edge of the back wall;

(2) a front edge of bottom wall is beveled and heat hardened to form a cutting edge;

(3) the blades in the stationary jaw are spaced apart and symmetrically attached to the back wall at a proximate end and joined together at a distal end with a cross member, said cross member forming a base for a plurality of teeth;

(4) each tooth on the blade cross member includes a shank welded to the cross member and a bolted-on, replaceable spade tip;

(5) the lower jaw is generally trapezoidal in plan and includes two outer blades and a center blade flanked by intermediate blades;

(6) the outer blades and center blades are rounded at a proximate end to conform with the curved front wall of the back support frame and taper towards a rounded distal end;

(7) the outer blades include a tab at the proximate end which passes through the curved wall and is braced against the back wall of the back support frame;

(8) the removable section of sawteeth are sandwiched between an outer edge of the outer blades and a wear plate;

(9) the blades are cross braced with a plurality of spaced apart rods to form a grid through which an operator can see and dirt may fall;

(10) the grapple claws are J-shaped in a side elevation with a straight shank at a proximate end and terminating in an arc at a distal end;

(11) each of the grapple claws is formed of two plates which converge at the distal end and which are held together with a straight gusset plate along the straight shank and a curved gusset plate along the arc;

(12) each of the grapple claws is mounted on a hinge pin journaled within a fixed hinge tube mounted between the mounting brackets, said mounting brackets being reinforced with first and second angled braces welded between the top wall and hinge tube;

(13) a first end of each hydraulic cylinder is hinged on a first shaft in cylinder ears attached to the mounting brackets and a second end of each hydraulic cylinder is hinged on a second shaft in cylinder ears attached to the plates forming each grapple claw at a transition between the shank and the arc;

(14) the first and second shafts are journaled in hinge tubes between the cylinder ears attached to the mounting brackets and the cylinder ears attached to the plates; and,

(15) such other features, as mentioned above, which will be in part apparent and in part pointed out.

The invention summarized above comprises the constructions hereinafter described, the scope of the invention being further indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 5:
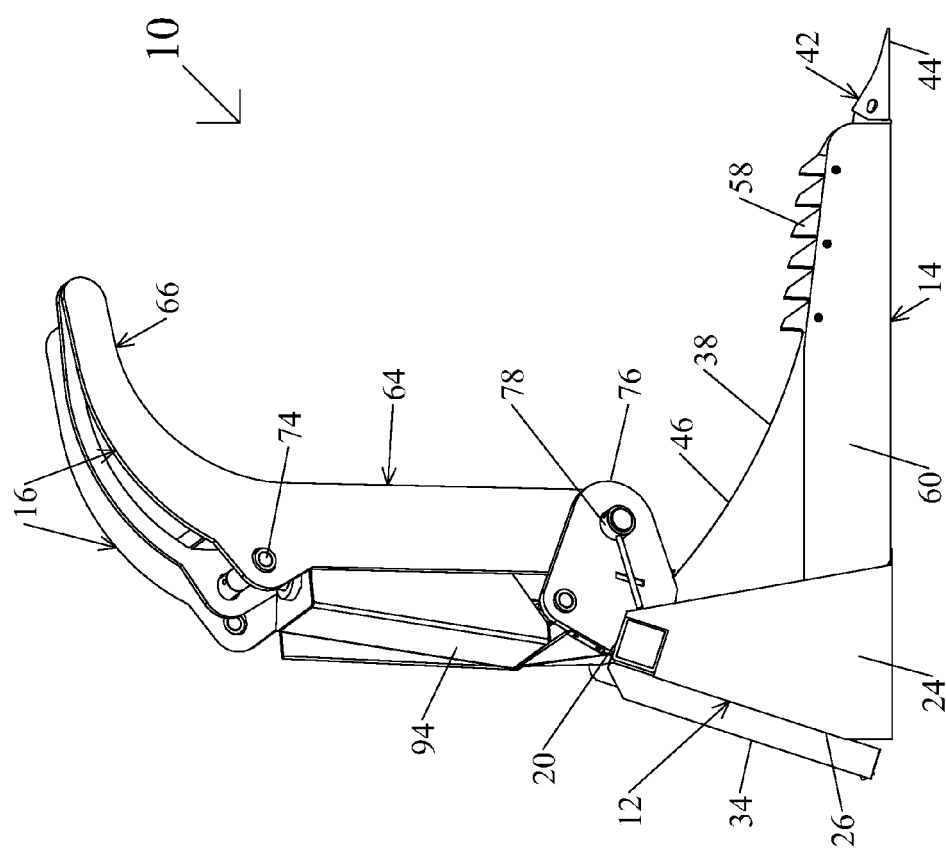
FIG. 5 is a side elevation of the attachment showing the grapple claws in open position.

Referring to the drawings more particularly by reference number, reference numeral 10 refers to an attachment in accordance with the present invention. In some instances to facilitate reading, a reference is made to a particular figure for an element but the same reference character may appear in other of the drawings. With this understanding, in major part, attachment 10 includes a back support frame 12, a stationary lower jaw 14 and a movable upper jaw formed by a pair of independently movable grapple claws 16 (FIG. 5).

Figure 1:
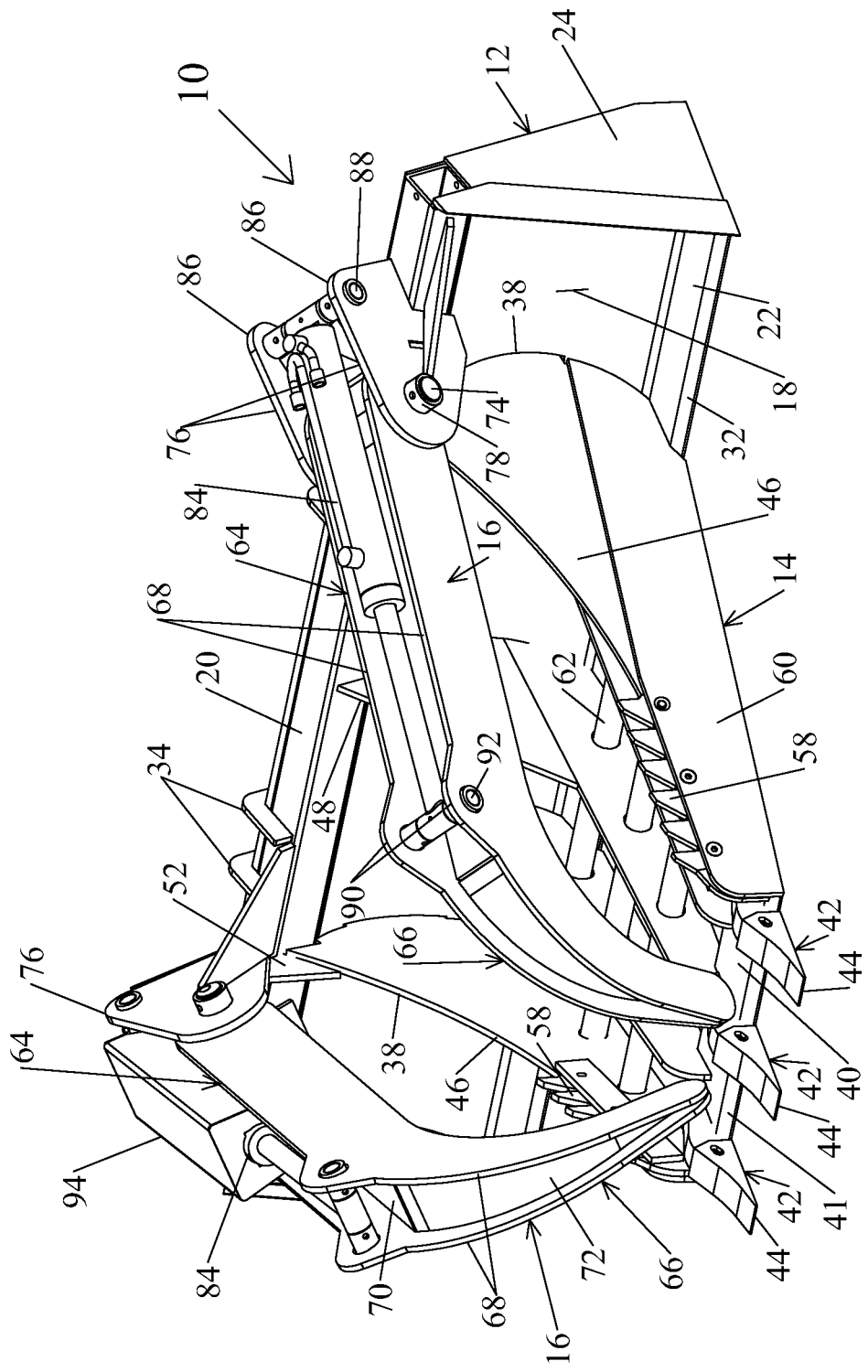
FIG. 1 is a perspective view of one attachment in accordance with the present invention, illustrated with a pair of grapple claws in closed position.
Figure 2:
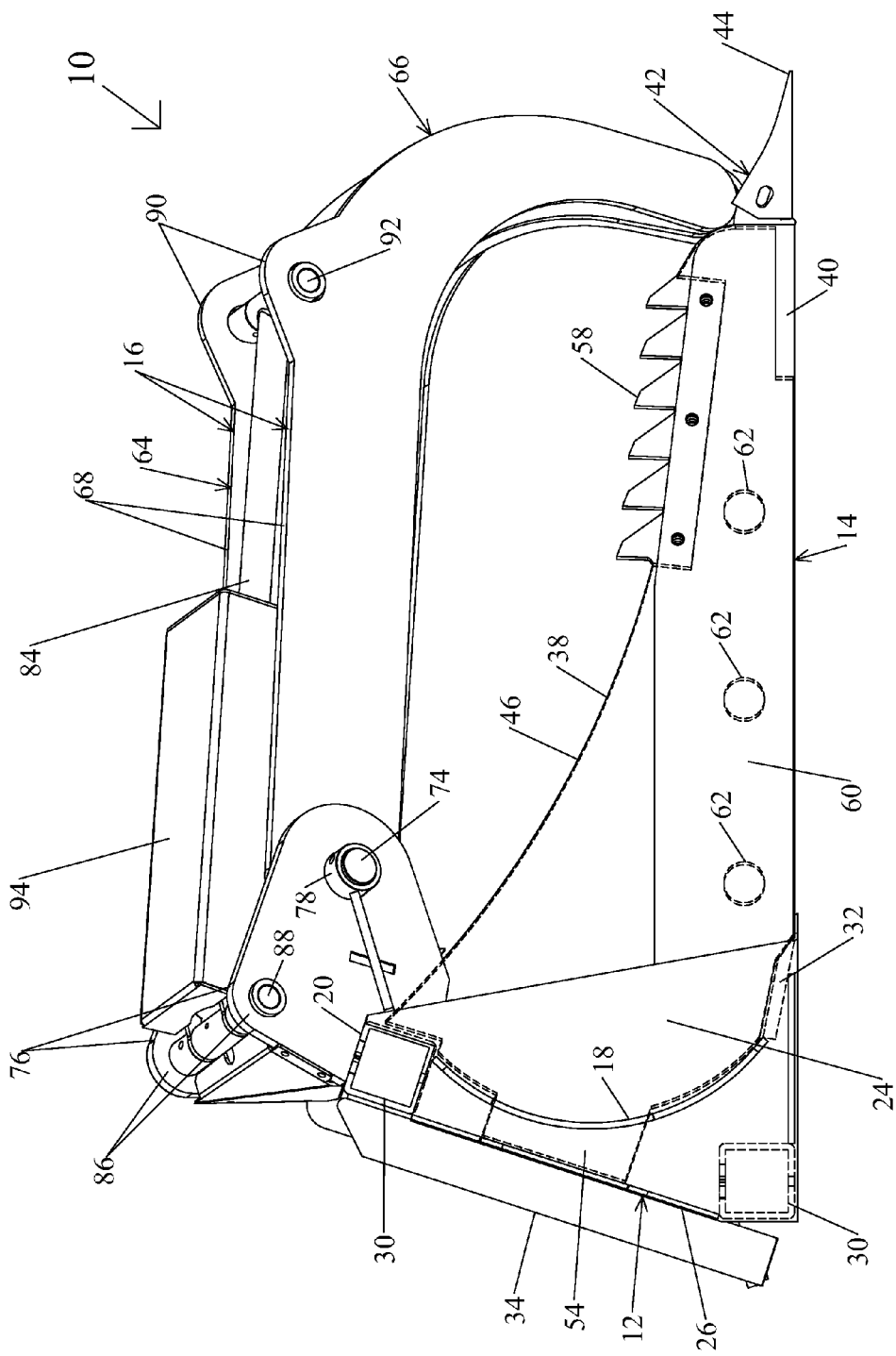
FIG. 2 is a side elevation of the attachment, partially broken away to show internal construction details of the back support frame and tab on the outer blades in the stationary lower jaw.
Figure 10:
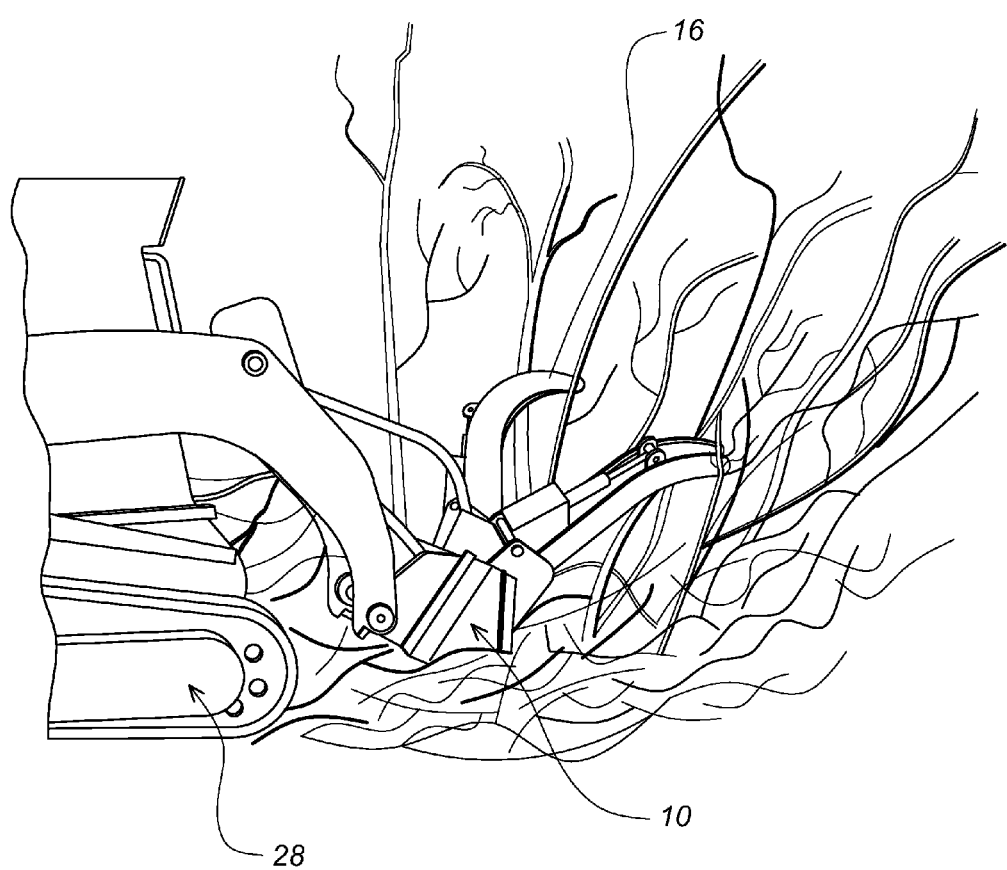
FIG. 10 is a view of the attachment in process of digging under a root ball and tree trunk with the grapple claws in open position; and, FIG. 11 is a view of the attachment in process of carrying a root ball with the grapple claws and stationary jaw applying three-point pressure on the root ball.

Back support frame 12 provides a rigid supporting frame for lower jaw 14 and grapple claws 16. It includes a curved front wall 18 serving as a moldboard, a top wall 20, a bottom wall 22, side walls 24 (FIG. 1), and a back wall 26 (FIG. 2) adapted for attachment to a loader 28 (FIG. 10). The front and back edges of top wall 20 and bottom wall 22 are approximately the same as the top and bottom edges of back wall 26. The side edges of top wall 20 are substantially shorter than the side edges of bottom wall 22 such that side walls 24 have a profile as best seen in FIG. 5 and shield the ends of front wall 18 for use in grading (FIGS. 1 and 2).

Figure 7:
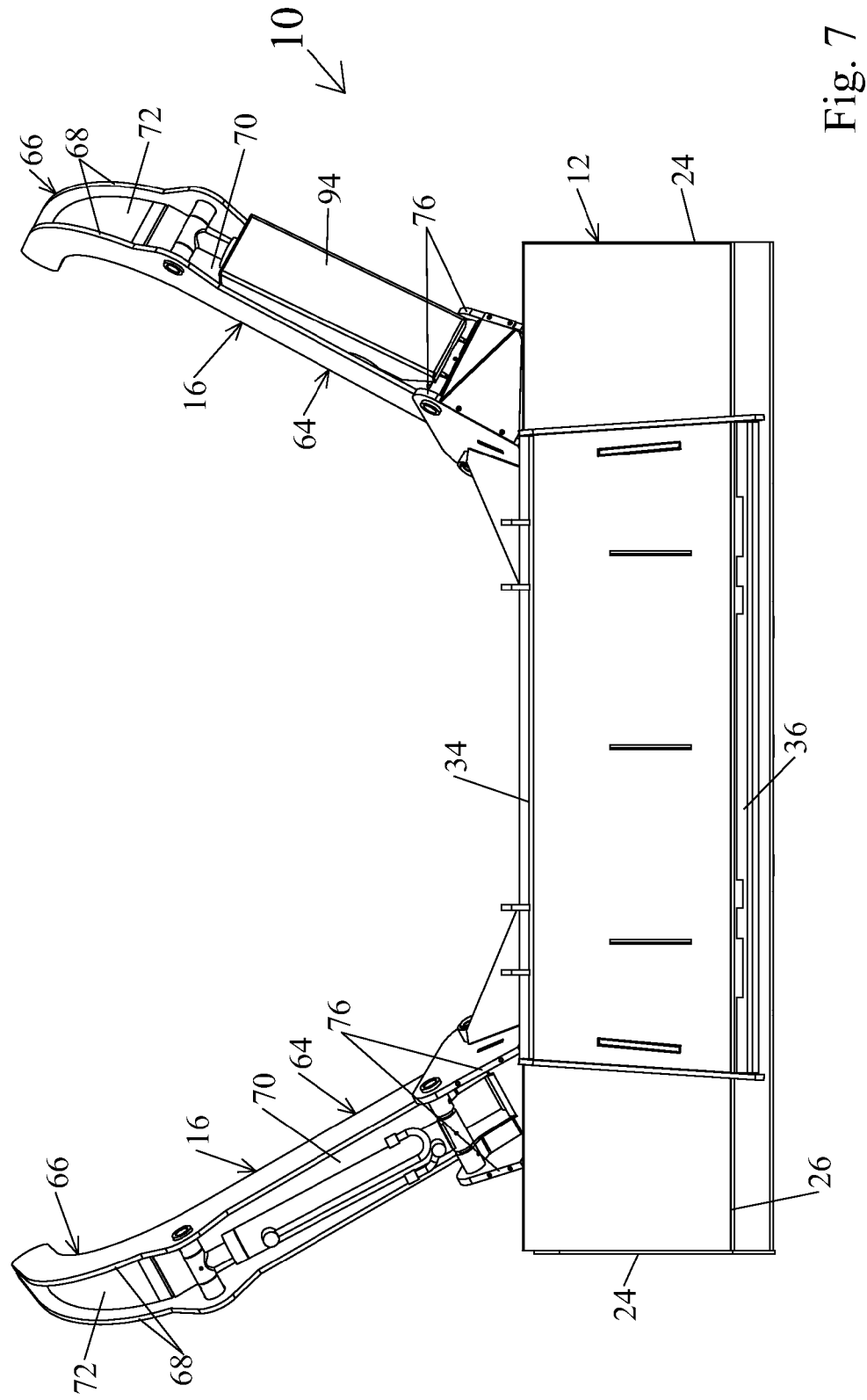
FIG. 7 is back elevation of the attachment with the grapple claws in open position.

In performing ground clearing operations, back support frame 12 may be subjected to high stresses, impacts and shock loads, and is thus made of high strength material. Back support frame 12 is preferably of welded construction and in one embodiment as shown in FIG. 2, the upper edge and lower edge of back wall 26 may be reinforced with square steel tubing members 30. Front edge of bottom wall 22 may be heat hardened and beveled to form a cutting edge 32. Appropriate mounting structures may be provided on back wall 26 whereby back support structure 12 and thus the entire attachment 10 is mounted on the lift arms of a loader. In the present example, such mounting structures include an attachment bracket 34 which are positioned on top wall 20 and back wall 26 so as to be engaged by corresponding mounting structures on the lift arms of the loader. Other structures 36 (FIG. 7) are provided along the bottom edge of back wall 26 to complete the attachment.

Figure 4:
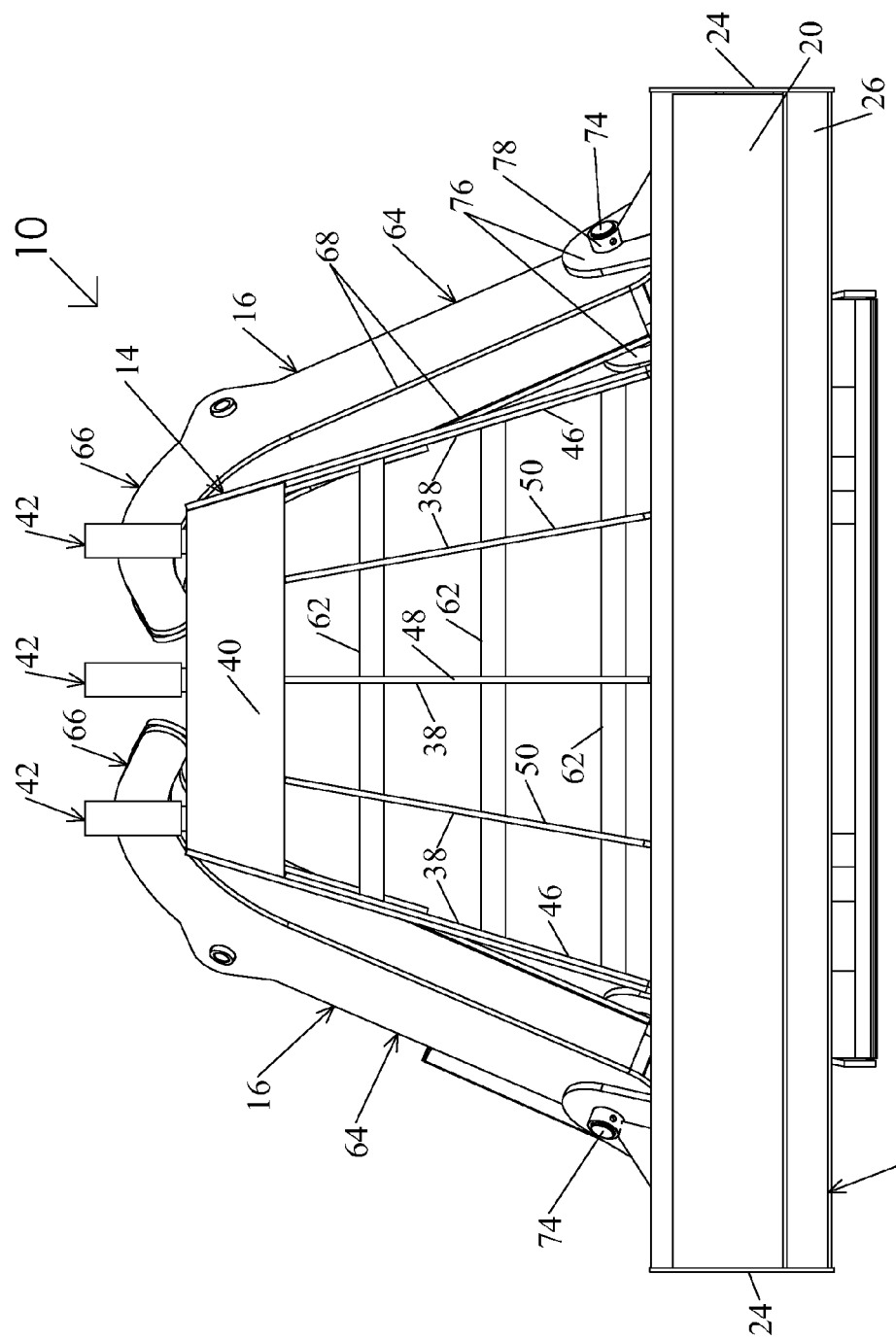
FIG. 4 is a bottom plan view of the attachment in closed position.
Figure 9:
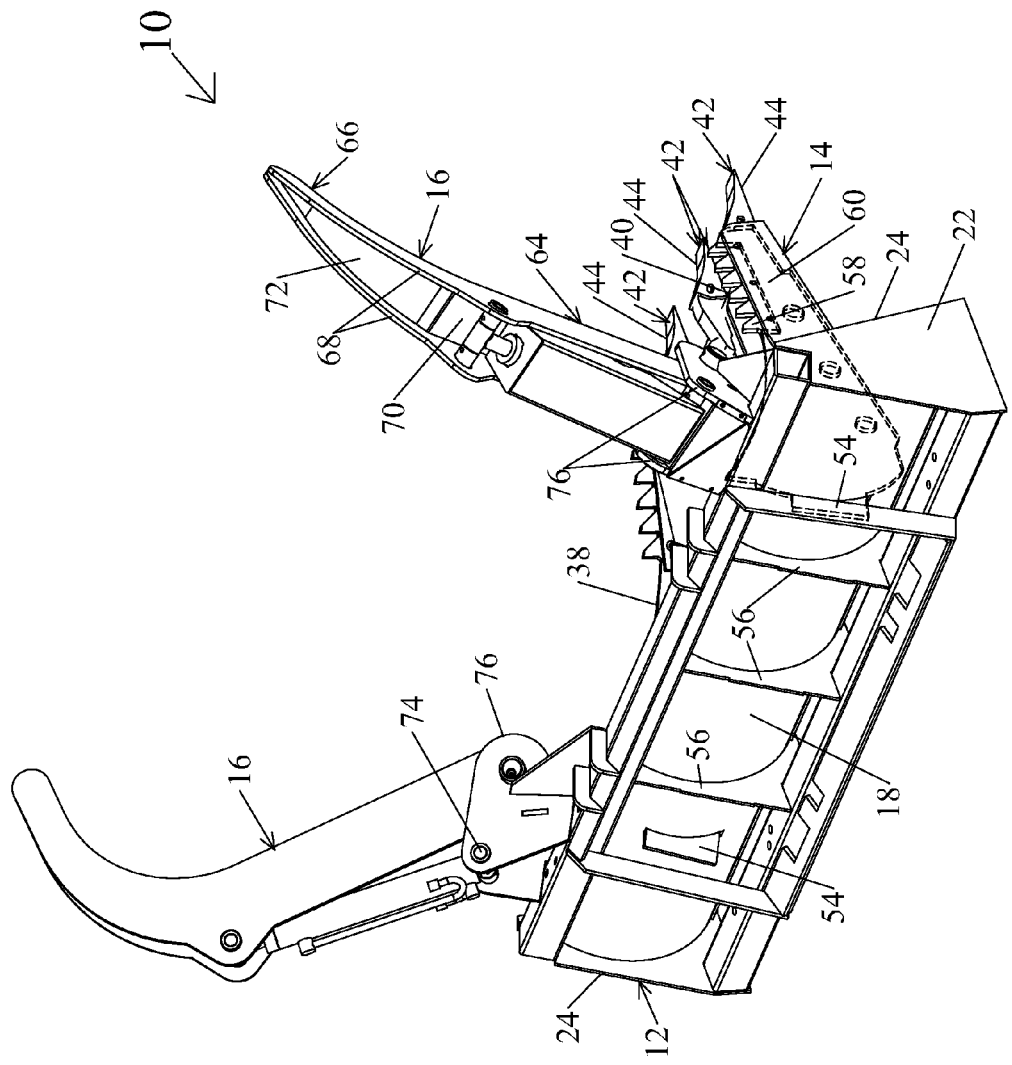
FIG. 9 is a rear perspective view of the attachment with the back wall of the back support frame removed to show internal structure and with a representative mounting structure for attaching the back support frame to a loader.

Lower stationary jaw 14 is formed from a plurality of blades 38 (FIG. 4) attached to front wall 18 of back support frame 12 and extending forward of bottom wall 22. In one embodiment, blades 38 are spaced apart, symmetrically clustered and are joined together at a distal end with a cross member 40 (FIG. 4). Cross member 40 forms a base with a beveled cutting edge 41 and a plurality of teeth 42 including a shank welded to the cross member 40 and a bolted-on, replaceable flat spade tip 44 (FIG. 1). To avoid clogging with debris, preferably fewer but wider teeth 42 are preferred. In the one embodiment illustrated in the drawings, lower stationary jaw 14 is generally trapezoidal in plan and includes two outer blades 46 and a center blade 48 flanked by intermediate blades 50 (FIGS. 1 and 4). Outer blades 46 and center blade 48 are rounded at a proximate end to conform to curved front wall 18 of back support frame 12 and taper towards a rounded distal end (FIG. 2). A gusset 52 (FIG. 1) is welded to a front face of top wall 20 and further stabilizes outer blades 46. As best seen in FIG. 9, taken in combination with FIG. 2, outer blades 46 include a tab 54 which passes through curved front wall 18 and is braced against back wall 26. Tabs 54 together with braces 56 along the inside of curved front wall 18 further strengthen back support frame 12. A strip of replaceable saw teeth 58 is sandwiched between an outer edge of outer blades 46 and a wear plate 60 (FIGS. 1 and 2) which may be formed of AR400 wear resistant steel or the like. A plurality of spaced apart rods 62 are provided between blades 38 to form a grid (FIG. 4) through which an operator may see and dirt may fall (FIG. 6) as more particularly described below. Blades 38 may be drilled to permit the passage of rods 62 and then be welded to the rods or alternatively short sections of rods 62 may be welded between blades 38 to form the grid.

Figure 3:
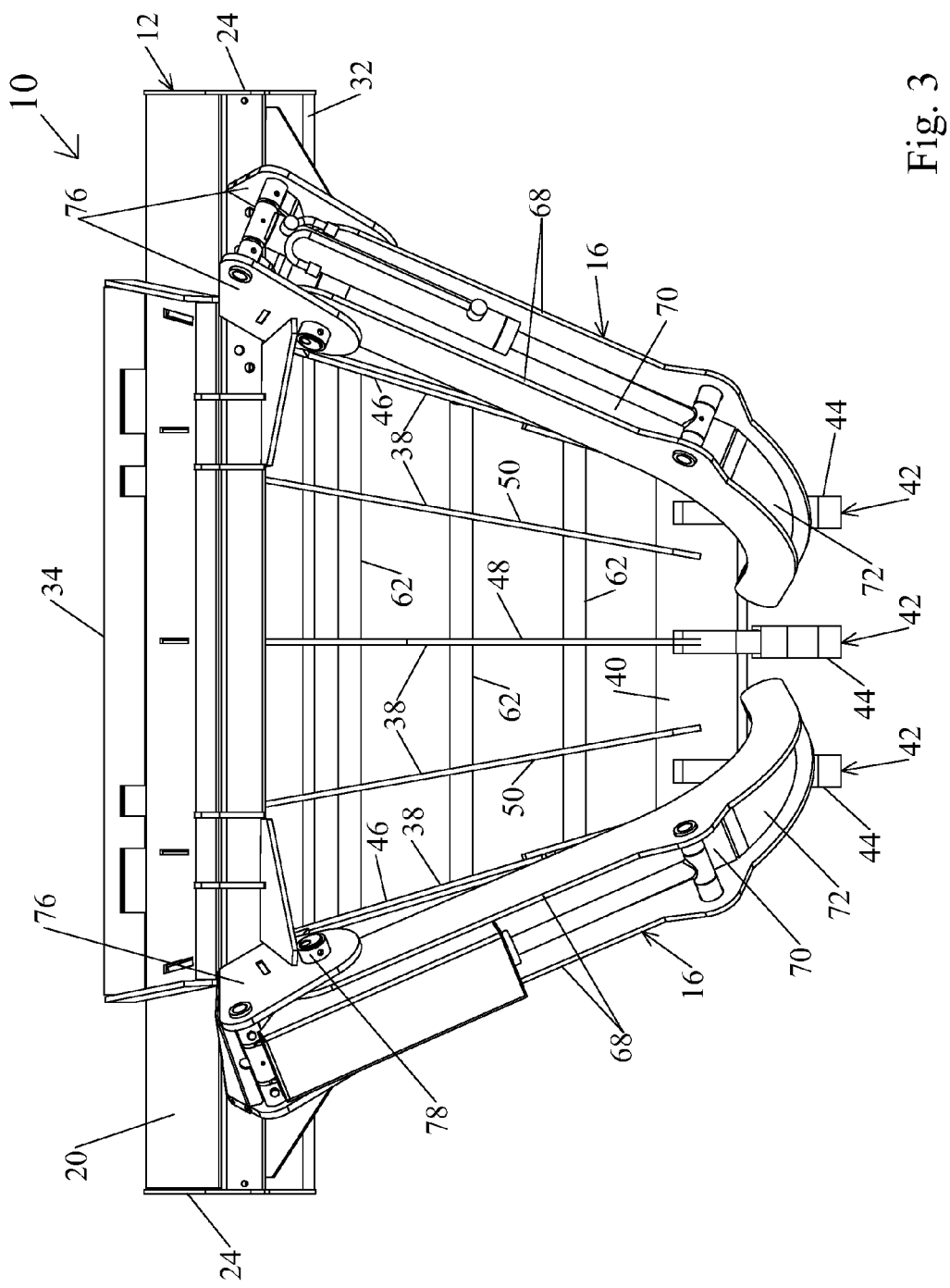
FIG. 3 is a top plan view of the attachment in closed position.
Figure 6:
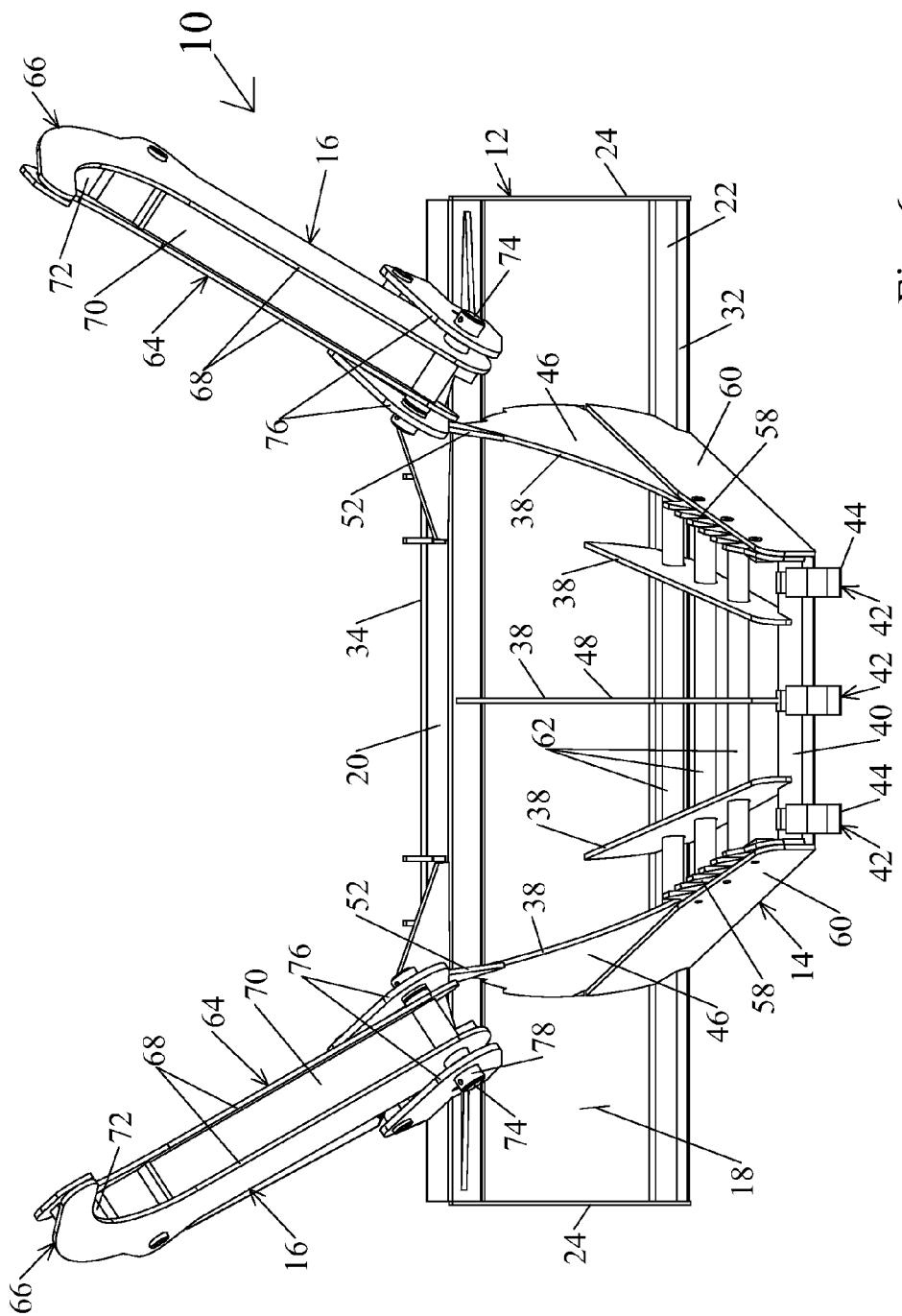
FIG. 6 is a front elevation of the attachment with the grapple claws in open position.
Figure 8:
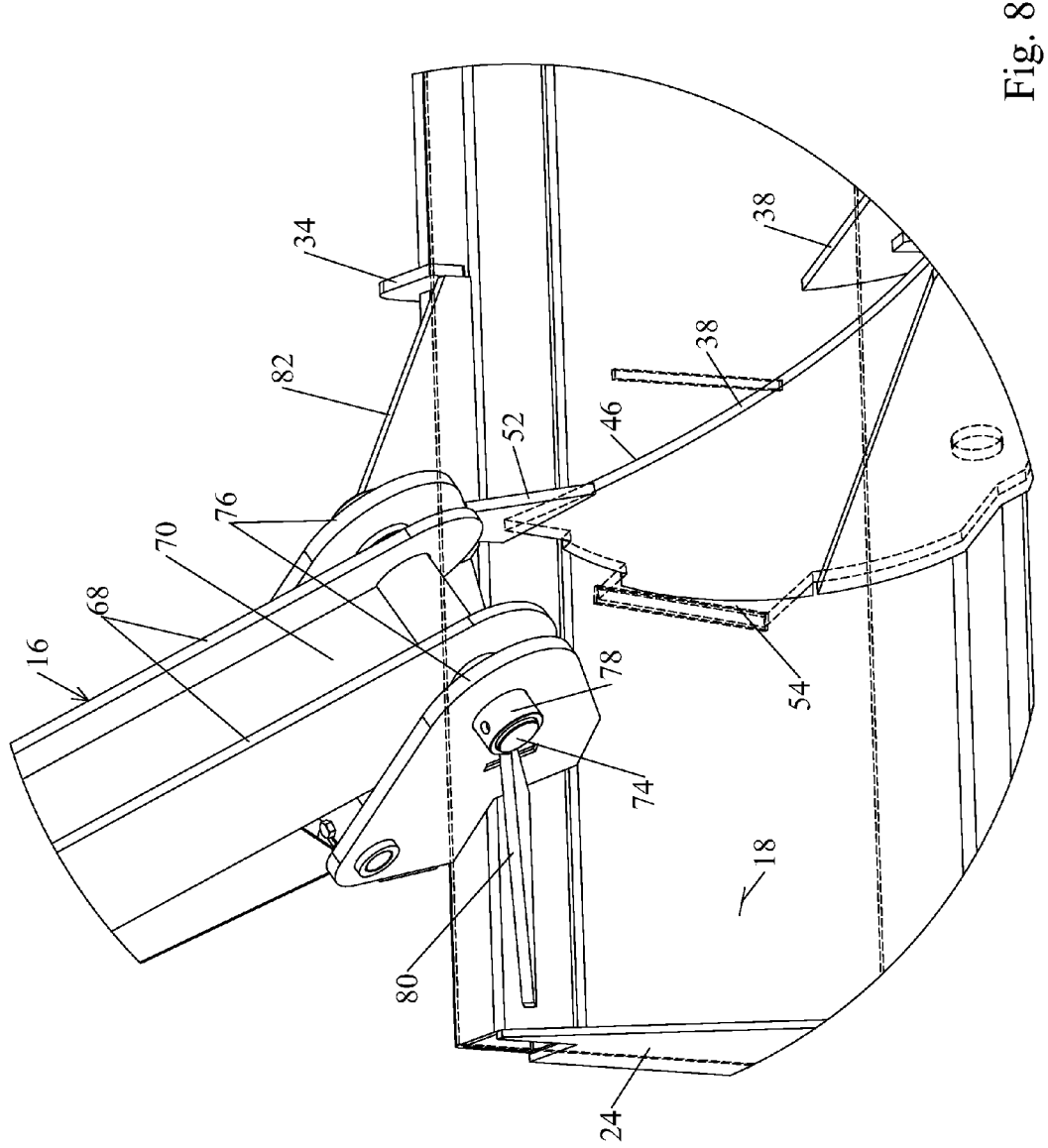
FIG. 8 is a detail showing one of the pivot support structures for mounting a grapple claw on the back support frame for oblique movement with respect to the back support frame.

Grapple claws 16 are J-shaped in side elevation (FIG. 2) with a straight shank 64 at the proximate end and terminating in an arc 66 at the distal end. Each of grapple claws 16 is formed of two plates 68 (FIGS. 1-3) which converge at the distal end and which are held together with a straight gusset plate 70 (FIGS. 1 and 3) along shank 64 and a curved gusset plate 72 (FIGS. 1 and 3) along arc 66. The proximate end of each grapple claw 16 is mounted in a hinged relationship on a hinge pin 74 (FIGS. 1 and 2) between a pair of mounting brackets 76 welded to top wall 20. Mounting brackets 76 are positioned on top wall 20 such that grapple claws 16 are obliquely movable between an open position as best seen in FIG. 6 and a closed position as shown in FIG. 1. To withstand the stresses applied to mounting brackets 76 by grapple claws 16, a fixed hinge tube 78 (FIGS. 1 and 2) is provided within which hinge pin 74 is journaled. As best seen in FIG. 8 a first angled brace 80 is welded to a front face of top wall 20 and along bracket 76 to hinge tube 78 and a second angled brace 82 is welded to the top face of top wall 20 and along bracket 76 to hinge tube 78. A hydraulic cylinder 84 (FIG. 1) is positioned on the back side of each grapple claw. For this purpose a first pivot support structure comprised of cylinder ears 86 and a pivot shaft 88 is provided on mounting brackets 76 and a second pivot support structure comprised of cylinder ears 90 and a pivot shaft 92 is provided on plates 68 (all seen in FIG. 1). A first end of hydraulic cylinder 84 is attached in a hinged relation to first shaft 88 and a second end of hydraulic cylinder 84 is attached in a hinged relation to second shaft 92. In the embodiment shown in the drawings, cylinder ears 90 are integrally formed with support brackets 76 and cylinder ears 90 are positioned along plates 68 at the transition between shank 64 and arc 66. Cylinder ears 86, 90 on support brackets 76 and plates 68 provide parallel pivoted support axes for shafts 88 and 92. A hinge tube may be provided for protecting first and second shafts 88, 92 from debris. For similar purpose a protective housing 94 (FIGS. 1 and 2) may be provided over the hydraulic hoses (not shown) which connect each of hydraulic cylinders 84 to an auxiliary hydraulic source accessible from the exterior of the loader.

With suitable mounting structures and not limited to those discussed above, attachment 10 may be adapted for use on any of a variety of loaders such as a skid loader, track loader, tractor front loader and the like. In use, back support frame 12 is hung on the loader arms and hydraulic cylinders 84 are connected to the loader's hydraulic source such that grapple claws 16 may be opened and closed with a control unit accessible from the interior cab of the loader. While it is preferred that grapple claws 16 move independently for reasons which will become more apparent, hydraulic cylinders 84 may be activated in unison.

For use in removing trees and brush, loader 28 may be driven with grapple arms 16 in open position as shown in FIG. 6 viewed from the front. In this position, grapple arms 16 do not block the operator's view from the cab and may direct underbrush to the side such that it does not get under the tracks or wheels of the loader, stopping forward progress. To be able to uproot a tree, teeth 42 must be under the tree root. Upon approaching a tree to be uprooted, attachment 10 is held at an angle as shown in FIG. 10 such that teeth 42 on stationary lower jaw 14 may be stabbed into the roots of the tree. For this the operator must judge the amount of penetration and angle depending on the tree size and species as some trees have tap roots while others have horizontal roots just under the surface of the soil. During the forward thrust, the operator's view is not blocked by lower jaw 14 (FIG. 1) because of the open grid formed by blades 38 and rods 62 or by grapple claws 16 (FIG. 10). On the backward thrust of attachment 10, saw teeth 58 on lower jaw rip the tree roots. In practice it may take several forward and backward thrusts with attachment 10 until teeth 42 are under the root ball and trunk.

Figure 11:
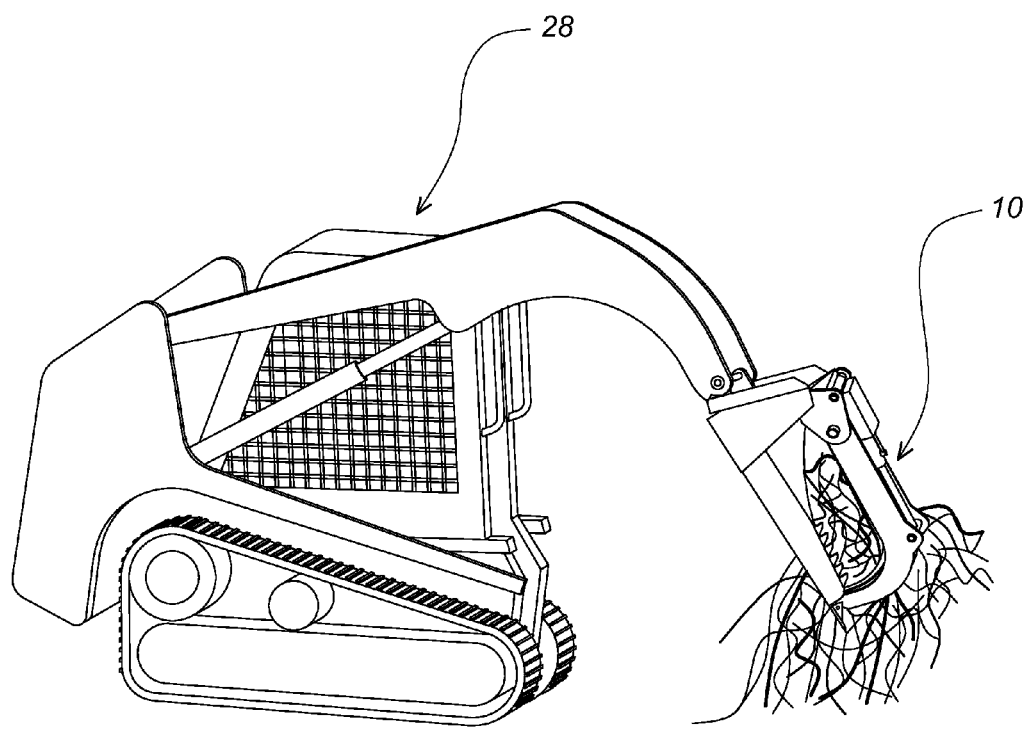

With teeth 42 under the root, the root ball may be rolled over with lower jaw 14 whereupon grapple claws 16 may be independently moved with hydraulic cylinders 84 into contact with the root ball as shown in FIG. 11 applying three-point pressure. Root balls differ in shape and in size. If the root ball rolls or wiggles, the operator may adjust grapple claws 16 from the cab until they make contact and apply pressure. The three-point pressure allows the operator to pick up the tree by the root ball with the trunk of the tree parallel with the power unit. The operator may then shake the root ball over the root hole to back fill the root hole while maintaining a good three-point grip with hydraulic control of grapple claws 16. After loose dirt has been shaken from the root ball, falling through the grid provided by blades 38 and rods 62, and with the root ball under firm grip and safe for transport, the operator may carry the tree by the root ball and stack the uprooted tree with others into a pile. With less dirt in the root ball, a tighter pile may be made for a better wildlife habitat or for burning.

When an area has been cleared of brush and trees with attachment 10 and the root holes partially filled with dirt shaken from the uprooted trees, beveled cutting edge 32 of bottom wall 22 of back support frame 12 may be used for grading assisted by curved front wall 18 serving as a moldboard and side walls 24 confining the dirt. Thus tree removal and field reclamation may be accomplished with a single implement at reduced equipment cost and operator time in changing implements.

In the above description, numerous specific details are set forth such as examples of some embodiments, specific components, devices, methods, in order to provide a thorough understanding of embodiments of the present disclosure. It will be apparent to a person of ordinary skill in the art that these specific details need not be employed, and should not be construed to limit the scope of the disclosure. In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication, and manufacture for those of ordinary skill Hence as various changes could be made in the above constructions without departing from the scope of the invention, it is intended that all matter contained in the above description or shown in the accompanying drawings shall be interpreted as illustrative and not in a limiting sense.

What is claimed:

1. An attachment for a loader comprising
a back support frame having a curved front wall, a top wall and a bottom wall, side walls and a reinforced back wall adapted for attachment to a loader,
a stationary lower jaw having outer and intermediate blades and is generally trapezoidal in plan and comprised of a plurality of blades angularly attached to the back wall by tabs passing through the curved front wall, cross braced and extending forward of the bottom wall, a removable section of saw teeth mounted to each outer blade,
a movable upper jaw comprising of a pair of converging grapple claws obliquely mounted relative to the back frame and in first and second pivot support structures on the top wall of the back support frame, each said grapple claw being J-shaped in a side elevation with a straight shank at a proximate end and terminating in an arc at a distal end and with a hydraulic cylinder positioned on the back side of each claw such that the claws are independently movable towards and away from the stationary jaw for applying three-point pressure.

2. The attachment of claim 1 wherein the blades in the stationary jaw are spaced apart and symmetrically attached to the back wall at a proximate end and joined together at a distal end with a cross member, said cross member forming a base upon which a plurality of teeth are mounted.

3. The attachment of claim 2 wherein each tooth includes a shank welded to the cross member and a bolted-on, replaceable spade tip.

4. The attachment of claim 1 wherein each of the pivot support structures for the grapple claws is reinforced with first and second braces welded between the top wall and the support structures.

5. An attachment for a loader comprising
a back support frame having a curved front wall, a top wall and a bottom wall, side walls and a reinforced back wall adapted for attachment to a loader,
a stationary lower jaw having outer and intermediate blades and is generally trapezoidal in plan and comprised of a plurality of blades angularly attached to the back wall by tabs passing through the curved front wall, cross braced and extending forward of the bottom wall, a removable section of saw teeth mounted to each outer blade,
a movable upper jaw comprising of a pair of converging grapple claws obliquely mounted relative to the back frame and in first and second pivot support structures on the top wall of the back support frame, each said grapple claw being J-shaped in a side elevation with a straight shank at a proximate end and terminating in an arc at a distal end and with a hydraulic cylinder positioned on the back side of each claw such that the claws are independently movable towards and away from the stationary jaw for applying three-point pressure, each said grapple claw formed of two plates which converge at the distal end and which are held together with a straight gusset plate along the straight shank and a curved gusset plate along the arc.

6. The attachment of claim 5 wherein the curved front wall is inset between the side walls at the bottom wall for use in confining graded dirt, said side walls terminating at a front edge of the bottom wall and said front edge of the bottom wall beveled and heat hardened to form a cutting edge for grading dirt.

7. The attachment of claim 6 wherein the removable sections of saw teeth are sandwiched between an outer edge of the outer blades and a wear plate.

8. An attachment for a loader comprising
a back support frame having a curved front wall, a top wall and a bottom wall, side walls and a reinforced back wall adapted for attachment to a loader,
a stationary lower jaw having outer and intermediate blades and is generally trapezoidal in plan and comprised of a plurality of blades angularly attached to the back wall by tabs passing though the curved front wall, cross braced and extending forward of the bottom wall, a removable section of saw teeth mounted on each outer blade, said outer blades rounded at a proximate end to conform with the curved front wall and tapered towards a rounded distal end, said outer blades include a tab at the proximate end which passes through the curved front wall and is backed against the back wall of the back support frame,
a movable upper jaw comprising of a pair of converging grapple claws obliquely mounted relative to the back frame and in first and second pivot support structures on the top wall of the back support frame, each said grapple claw being J-shaped in a side elevation with a straight shank at a proximate end and terminating in an arc at a distal end and with a hydraulic cylinder positioned on the back side of each claw such that the claws are independently movable towards and away from the stationary jaw for applying three-point pressure.

9. The attachment of claim 8 wherein the blades are cross braced with a plurality of spaced apart rods to form a grid through which an operator can see and dirt may fall.

10. The attachment of claim 8 wherein the distal end of the blades are joined together with a cross member, said cross member forming a base for a plurality of teeth.

11. The attachment of claim 10 wherein each tooth includes a shank welded to the cross member and a bolted-on replaceable spade tip.

12. The attachment of claim 8 wherein the curved front wall is inset between the side walls at the bottom wall for use in confining graded dirt, said side walls terminating at a front edge of the bottom wall and said front edge of the bottom wall beveled and heat hardened to form a cutting edge for grading dirt.

13. The attachment of claim 8 wherein the removable sections of saw teeth are sandwiched between an outer edge of the outer blades and a wear plate.

14. The attachment of claim 8 wherein each of the grapple claws is formed of two plates which converge at the distal end and which are held together with a straight gusset plate along the straight shank and a curved gusset plate along the arc.

15. The attachment of claim 14 wherein each of the grapple claws is mounted on a hinge pin journaled within a fixed hinge tube mounted between the mounting brackets, said mounting brackets being reinforced with first and second angled braces welded between the top wall and hinge tube.

16. The attachment of claim 15 wherein a first end of each hydraulic cylinder is hinged on a first shaft in cylinder ears attached to the mounting brackets and a second end of each hydraulic cylinder is hinged on a second shaft in cylinder ears attached to the plates forming each grapple claw at a transition between the shank and the arc.

17. The attachment of claim 16 wherein the first and second shafts are journaled in hinge tubes between the cylinder ears attached to the mounting brackets and the cylinder ears attached to the plates.

* * * * *